US005136483A

United States Patent [19]

Schöniger et al.

[11] Patent Number: 5,136,483

[45] Date of Patent: Aug. 4, 1992

[54] ILLUMINATING DEVICE

[76] Inventors: Karl-Heinz Schöniger, Barbarossastr. 40/6, 7300 Esslingen; Winfried Scheid, Ringweg 14, 7333 Ebersbach, both of Fed. Rep. of Germany

[21] Appl. No.: 573,895

[22] Filed: Aug. 28, 1990

[30] Foreign Application Priority Data

Sep. 8, 1989 [DE] Fed. Rep. of Germany ....... 3929955

[51] Int. Cl.[5] .............................................. B60Q 1/00

[52] U.S. Cl. ........................................ 362/61; 362/31; 362/231; 362/800

[58] Field of Search ....................... 362/31, 61, 82, 83, 362/343, 26, 800, 80, 231, 237

[56] References Cited

U.S. PATENT DOCUMENTS

| | | | |
|---|---|---|---|
| 3,892,959 | 7/1975 | Pulles | 362/31 |
| 4,177,502 | 12/1979 | Hiscock | 362/345 |
| 4,277,819 | 7/1981 | Sobota et al. | 362/800 |
| 4,573,766 | 3/1986 | Bournay, Jr. et al. | 362/31 |
| 4,630,895 | 12/1986 | Abdala, Jr. et al. | 362/31 |
| 4,714,983 | 12/1987 | Lang | 362/31 |
| 4,965,950 | 10/1990 | Yamada | 362/31 |

FOREIGN PATENT DOCUMENTS

| | | | |
|---|---|---|---|
| 3542292A1 | 7/1986 | Fed. Rep. of Germany . | |
| 1599621 | 8/1970 | France . | |
| 2049387 | 3/1971 | France . | |
| 2139340 | 11/1984 | United Kingdom | 362/800 |

*Primary Examiner*—Ira S. Lazarus
*Assistant Examiner*—Sue Hagarman
*Attorney, Agent, or Firm*—McGlew & Tuttle

[57] ABSTRACT

An illuminating or light emitting device for use as a headlamp, a signaling lamp or other lamp for shining light in a beam or otherwise. It comprises as its main parts a generally flat transparent illuminating element with a circumferential edge in which a plurality of light emitting elements such as LED's are set. The edges are provided with an inwardly reflecting layer. The front side of the illuminating element is in the form of a light radiating surface, while the rear side is completely covered with an inwardly reflecting layer. Such an illuminating device may have a very flat overall shape, has a low current requirement and has a large homogeneous radiating area. It more especially lends itself to use on vehicles.

10 Claims, 1 Drawing Sheet

ILLUMINATING DEVICE

BACKGROUND OF THE INVENTION

The invention relates to an illuminating device such as a headlamp, signaling lamp, that is to say lamps shining light in beam or otherwise, comprising an essentially flat transparent illuminating element with a plurality of light emitting elements such as LED'S set in a marginal edge thereof, such edges being provided with a reflecting layer.

The German pre-examination specification 3,825,436 describes light conducting plates having LED'S arranged at their edges so that the light emerges at rear adhesively attached symbols and illuminates them. The light of the LED'S thus merely serves to illuminate the indicating or advertizing logo and the arrangement may not generally be used as an illuminating device, as for instance in the form of a lamp for shining light onto objects.

Conventional headlights, taillights etc. have an incandescent bulb at the focus of a reflector. One disadvantage of such illuminating devices is that they have a considerable overall depth, this making itself felt more particularly in the case of automobile applications where space is at a premium. Owing to the poor luminous efficiency of incandescent lamps high temperatures occur, which lead to the requirement for a design ensuring heat dissipation by conduction. When an incandescent lamp fails, the illuminating device is no longer able to function so that, more particularly in the case of essential equipment such as headlights and taillights, immediate replacement becomes imperative. However, such a defect may lead to hazardous situations.

There has already been a proposal to arrange a plurality of LED'S in an area to form a vehicle taillight. In this case there is however the shortcoming that in place of a homogeneous illuminating area there is simply a cluster of bright spots.

SHORT SUMMARY OF THE PRESENT INVENTION

Accordingly one object of the present invention, is to provide an illuminating device of the type initially referred to (headlamp, taillight) herein which has a flat overall form.

A still further object of the invention is to provide such an illuminating device which has a high luminous efficiency.

Yet a further object of the invention it so provide such a device which has a relatively equal distribution of the light.

In order to achieve these or other objects appearing from the present specification claims and drawings, the present invention provides a device in which the front side of the illuminating element is in the form of a radiating surface and the rear side is completely covered with a reflecting layer. The plurality of light emitting elements, which are preferably in the form of LED'S, provides that any defect in one LED will only have a very minor effect so that there will be no safety hazards and immediate replacement is not called for. The circumferential edges may be fitted with a very large number of LED'S so that, more particularly in the case of use of modern high output diodes, such a large luminous flux may be produced that use in headlamps, taillights etc. is possible. The arrangement of the electrical leads so that they extend from the LED'S and emerge to the side of the lamp means that a very flat overall design is possible such that the illuminating device may be readily mounted, for instance, on the outside of bodywork of an automobile and furthermore hardly requires any space. Even distribution on the circumferential edges means that the light radiating area is very evenly illuminated, the light being fully directed in a forward direction owing to the completely reflecting layer on the rear side. Emergence of light at the edges is effectively prevented by a further reflecting layer.

Further developments of the invention are described in the claims.

In order to achieve an even more regular distribution of the light in the marginal part having the light emitting elements the front side has a reflecting layer. This means that the light is only able to reach the middle part of the illuminating element so as to be radiated forwards thereby. In order to focus or collimate the light more particularly in the case of headlamps, taillights and the like, it is an advantage if the front side/or the edges and/or the back side of the illuminating element have a form such as to beam or collimate the light. For this purpose the front side is preferably made convex and/or the back side is made conically concave, and/or the edges are made with an essentially concave cross section. In accordance with a further expedient possibility the front side, the edges and/or the rear side of the illuminating element are provided with light collimating humps or recesses. The selection of the means depends more particularly on whether the light is to be radiated in a generally parallel beam or in some required diverging form. The individual features may be combined together to supplement each other or some features may be omitted. Owing to its form the illuminating element leads additionally to a unidirectional or beamed form of the emerging light, that is to say the reflecting layer or, respectively, the mirror coating on the rear side takes the place of a separate reflector and a separate light radiating means with optical elements.

The reflecting layer may be economically and simply produced by sputtering, bonding or by electroplating. In the case of a very high luminous output, that is to say in the case of there being a very large number of high output light emitting elements or diodes, the reflecting layer may be expediently connected with a cooling body or heat sink.

In order to make possible a wider range of designs, the illuminating device may be provided with different-colored LED'S, in which respect, in order to achieve a certain, desired color of the light only those LED'S will be turned on which have this light color or LED'S for different colors will be operated which in combination produce the desired mixed color or secondary color. To take an example, it is possible for red, green and blue LED'S to be used in order to produce white light. By utilizing LED'S of different colors it is thus possible to achieve different effects and to open up different applications for an illuminating device. As an example, the illuminating element may be in the form of a member made of plastic to act as the taillight of an automobile, in which there are also braking, reverse and/or blinker functions. By using different LED'S it is thus selectively possible to produce red, yellow or white light in accordance with the instantaneous function desired. If the illuminating element is in the form of an automobile lamp, as for instance in the form of a parking light, then it will be obvious that only the white color or, for instance in the case of a French automobile, only the yellow color will be needed. The lamp in accordance with the invention furthermore lends itself to adaptation for use as a construction site lamp on a highway, the LED'S then being caused to flash and being operated at a higher power. When caused to flash the LED'S may be run with an up to tenfold increase in the amperage.

Further features and advantages of the invention will be gathered from the ensuing description of two embodiments thereof referring to the drawings.

LIST OF THE SEVERAL VIEWS OF THE DRAWINGS

DETAILED DESCRIPTION OF WORKING EMBODIMENTS OF THE INVENTION

Figure 1:
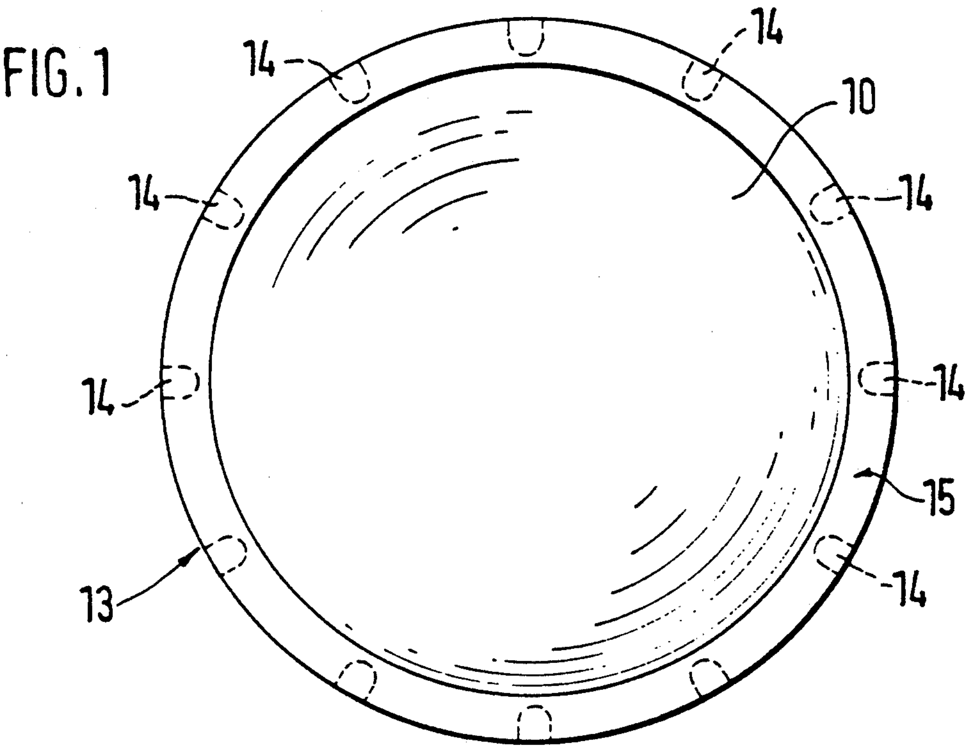
FIG. 1 is a plan view of an illuminating device in the form of a round headlamp or beam producing lamp.
Figure 2:
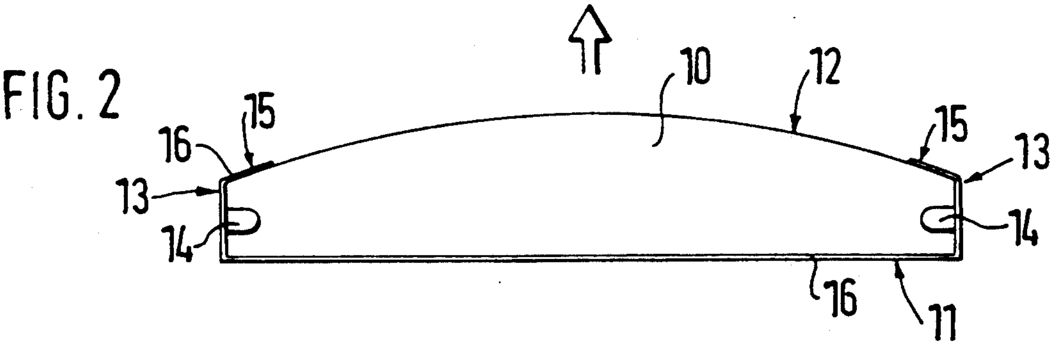
FIG. 2 is a cross section taken through the headlamp of FIG. 1.
Figure 3:
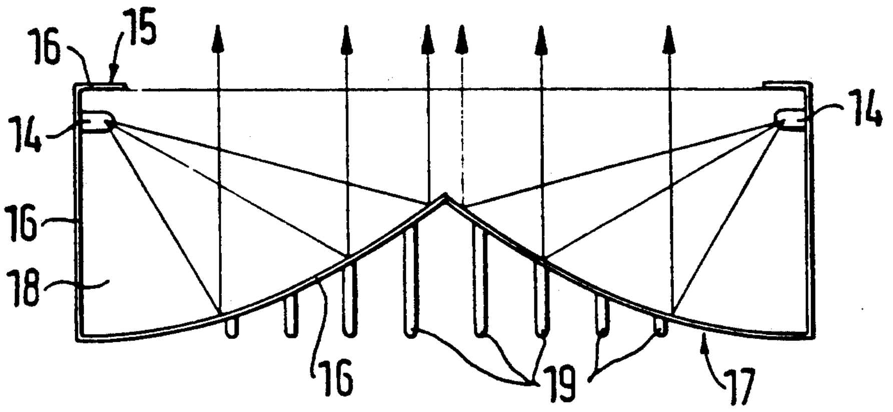
FIG. 3 is a cross section taken through a further illuminating device in the form of a headlamp.

In the case of the first working embodiment of the invention shown in FIGS. 1 and 2 a headlamp or lamp for producing a beam of light has at its main parts a transparent illuminating or light emitting element 10, which is made in the form of a round plate of glass or transparent resin such as PMMA. The material may contain fluorescent particles. While the rear side 11 of the illuminating element is made flat, the front side 12 is configured in a convex manner like a converging lens. Twelve LED'S 14 are arranged with a regular spacing on the circumferential edge 13 of the illuminating element 10 and are seated in suitable openings. The number thereof is obviously able to be freely chosen and depends on the luminous flux to be produced. In the case of a headlamp the arrangement may be considerably more crowded than, for instance, in the taillight of an automobile. The rear side 11, the edge 13 and the a strip-like part 14, covering over the LED'S 14 to the front, of the front side 12 are provided with an inwardly reflecting layer 16.

This layer may be produced by sputtering, by the adhesive bonding of a film or by electrolytic deposition so that the respective surfaces are mirrored and the entire luminous flux is reflected thereat and cast back into the interior space.

The convex design of the front side leads to a focussing or collimation of the light as a beam. Dependent on the type of the desired beaming effect various possible designs of the front side are possible, as for instance in accordance with the desired angle of the output beam.

In the case of the second embodiment in accordance with the invention the rear side 17 of an illuminating element 18 is made conically convex, and owing to the round cross section of the illuminating element 18 in the horizontal plane the result is generally a circular cone with a generatrix bowed towards the cone's axis. As in the first embodiment of the invention the LED'S 14 are arranged so as to be distributed about the circumference so as to be respectively at the focus of the reflector which is parabolic or elliptical in cross section and is formed by the rear side 17. As is diagrammatically indicated by arrows, this makes it possible to achieve an essentially parallel output beam. The illuminating or light emitting element 18 in this case not only sets the form of the reflector but also performs the function of conducting the light and acting as a mount for the LED'S 14.

In order to ensure dissipation of heat in the case of a high luminous flux the rear side 17 is provided with annular cooling bodies 19, which are adapted to the conically concave form of the rear side 17. In this case as well it is naturally possible for the annular cooling members to be replaced by other shapes, which may project past and out of the conical concavity if desired. Since LED'S have a very high luminous efficiency and only lead to a low heating effect, such cooling members 19 are only required in the case of a very compact arrangement of the LED'S or if the latter are designed for very high power levels.

Combinations of the two working embodiments as regards the form of the front and rear sides of the illuminating element are also possible, in which respect variations in the configuration of the cross section are possible in order to comply with the manner in which the light is to be put in the form of a beam. In the case of rectangular or oval illuminating devices and of illuminating devices with other horizontal forms of cross section variations in the form of the front and rear sides may be necessary. The edge parts may also have a form differing from that shown in the figures in order to aid in collimating the light and may for example have a concave cross section in order to ensure that the light is shone into the middle of the illuminating element.

In addition to design as an automobile headlamp or as a parking light, such illuminating means may be used for other signaling and illuminating purposes, as for example for combined taillight sets for automobile, that is to say as combinations of a taillight, a braking light, a reverse light and/or a blinker lamp. The same may be made separate or integrated in one illuminating device. In order to produce the different colors of the light needed for this purpose, various colors of LED will be used. Thus red LED'S will be used for the taillight and brake light functions while yellow LED'S will be used for the blinker lights. In order to produce different degrees of brightness for the braking light and the taillight it is possible for respectively different numbers of LED'S to be put into operation. In order to produce white light for the reverse light it is possible for red, green and blue LED'S to be used simultaneously, whose colors will be complementary to each other and lead to white light. If white LED'S are available it will obviously be possible to use them as such. Furthermore, it is also possible to use other light emitting elements which have comparable properties and functions.

Illuminating devices with different colors of LED'S may be used also for illuminating articles in advertizing and in show business, in the entertainment industry and the like. A single beam producing device may thus be used to produce different light effects.

The LED'S may also be caused to flash in special applications. The low amperage required for LED'S means that very small energy storing devices may be used in applications in construction sites.

In place of homogeneously formed front sides, edges and back sides for beaming the light, it is also possible to have individual raised and recessed portions, whose configuration will respectively produce a collimating action, as for example in the form of a plurality of oblique faces or of reflector-like individual elements.

We claim:

1. An illuminating device, comprising: an essentially flat, transparent illuminating housing including a front side, a rear surface and a circumferential side wall; a plurality of light emitting elements supported by said housing along said circumferential side wall; a reflecting layer provided in said housing on said rear surface thereof and along said circumferential sidewall, said reflective layer reflecting inwardly with respect to said housing; and, light collimating projection means including a front element in the form of one of a convex lens or an element with raised parts or recesses for projecting, and collimating light reflected by said reflecting layer and generated by said light emitting element.

2. An illuminating device according to claim 1, wherein said collimating projection means comprises a front convex lens element.

3. The illuminating device as claimed in claim 1, wherein the front side is provided with a reflecting layer in an edge part connected to said side wall, which has the light emitting elements.

4. The illuminating device as claimed in claim 1, wherein the reflecting layer is produced by sputtering, by the adhesive attachment of a film or by electroplating.

5. The illuminating device as claimed in claim 4, wherein the reflecting layer is connected with a cooling member adapted to take up heat therefrom.

6. The illuminating device as claimed in claim 1, wherein for producing desired light colors said light emitting elements comprise different LED'S are provided, in which respect more particularly for producing white light red, green and blue LED'S are provided.

7. The illuminating device as claimed in claim 6, wherein the LED'S with different colors are able to be selectively turned on so that LED'S in one color only or LED'S with different colors may be put into operation.

8. The illuminating device as claimed in claim 1, designed in the form of a motor vehicle headlamp or as a resin body in the form of an automobile taillight, more particularly as a combined structure with a brake light, a reverse light and/or a blinker.

9. The illuminating device as claimed in claim 1, designed in the form of a warning light for construction sites and the LED'S designed to flash while being operated with enhanced power.

10. A light projector for illuminating distant objects, comprising: a substantially flat transparent housing including a rear surface, circumferential side wall and a front lip; a light radiating surface provided on an interior side of said rear surface, circumferential side wall and said front lip for reflecting light inwardly from each of said rear surface, said circumferential side wall and said front lip; a plurality of light emitting diodes supported by said circumferential side wall and distributed substantially uniformly along said circumferential side wall, said lip extending outwardly from said side wall a distance which is greater than the distance said light emitting diodes extend from said circumferential side wall; light collimating means including a conical lens connected to said lip at a front side of said housing for focusing light, reflected by said light radiating surface, outwardly from said housing in a direction substantially perpendicular to said back wall.

* * * * *